United States Patent [19]

Kitano et al.

[11] Patent Number: 4,481,452
[45] Date of Patent: Nov. 6, 1984

[54] CONTROL CIRCUIT FOR ELECTROMAGNETIC DEVICES

[75] Inventors: Yuichi Kitano; Yoshiharu Tada, both of Higashimatsuyama, Japan

[73] Assignee: Diesel Kiki Co., Ltd., Tokyo, Japan

[21] Appl. No.: 382,936

[22] Filed: May 28, 1982

[30] Foreign Application Priority Data

May 29, 1981 [JP] Japan .................................. 56-81125

[51] Int. Cl.³ .............................................. G05F 1/08
[52] U.S. Cl. .................................. 318/681; 318/678; 318/293
[58] Field of Search ............... 318/638, 652, 671, 672, 318/677, 678, 681, 139, 280, 283–285, 291–294, 345 B, 346; 301/28, 29, 31

[56] References Cited

U.S. PATENT DOCUMENTS

| 3,935,524 | 1/1976 | Cap et al. .................... 318/678 X |
| 3,975,669 | 8/1976 | Tyler .......................... 318/672 X |
| 3,978,384 | 8/1976 | Gucker ....................... 318/280 X |
| 4,066,945 | 1/1978 | Korte, Jr. .................... 318/678 X |
| 4,070,610 | 1/1978 | Rudich, Jr. ................. 318/678 |
| 4,146,801 | 3/1979 | Vali et al. ................... 318/681 X |
| 4,358,724 | 11/1982 | Haner ......................... 318/678 X |

Primary Examiner—B. Dobeck
Attorney, Agent, or Firm—Guy W. Shoup; Gerard F. Dunne

[57] ABSTRACT

In a control circuit, which has a current switching-over circuit including at least four switching transistors for controlling a current flowing through an electromagnetic device, the control circuit has driving circuits each of which drives the switching transistors in such a way that a short circuit does not occur during the switching-over operation thereof.

5 Claims, 10 Drawing Figures

FIG. 2A OUTPUT LEVEL OF THE COMPARATOR 4

FIG. 2B TRANSISTOR 6

FIG. 2C TRANSISTOR 9

→ TIME $V_1$ $V_{CE1}$ $V_{CE2}$ $V_{CE3}$ $V_{CE4}$ $t_1\ t_3\quad t_4 t_5\ t_6 t_2$

→TIME

CONTROL CIRCUIT FOR ELECTROMAGNETIC DEVICES

The present invention relates to a control circuit for electromagnetic devices, such as electric motors, solenoid actuators and electromagnetic relays, and more particularly to a control circuit for changing the direction of the driving current for an electromagnetic device.

In order to control the direction of the current for driving various electromagnetic devices, such as electric motors and solenoid actuators, there has previously been proposed a control circuit having a current switching-over circuit consisting of switching transistors, wherein the direction of the current flowing through the electromagnetic device is changed by controlling the ON/OFF condition of these transistors.

In FIG. 1, there is shown an example of such a control circuit, which is used for controlling a d.c. motor for actuating a door provided in a vehicle air-conditioner for changing the degree or direction of an air flow by using a d.c. motor to set the door at any desired position. The control circuit shown in FIG. 1 has a voltage comparator 4 having a negative input terminal to which a reference voltage $V_H$ is applied and having a positive input terminal to which a position voltage signal $V_{IN}$ is applied through a resistor 1. The voltage signal $V_{IN}$ is produced by a position sensor 3 for detecting the position of a door 2 of a vehicle air-conditioner (not shown), and the level of the position voltage signal $V_{IN}$ varies in accordance with the position of the door 2.

The output terminal of the voltage comparator 4 is connected through a resistor 5 to the base of a PNP switching transistor 6 and is connected through a resistor 7 and a diode 8 to the base of an NPN switching transistor 9. The voltage signal $V_{IN}$ is applied through a resistor 11 to the negative input terminal of another voltage comparator 10 and another reference voltage $V_L(<V_H)$ is applied to the positive input terminal thereof. The output terminal of the voltage comparator 10 is connected through a resistor 12 to the base of a PNP switching transistor 13 and is connected through a resistor 14 and a diode 15 to the base of an NPN switching transistor 16. A resistor 17 is connected between the base and the emitter of the transistor 6, and the emitter of the transistor 6 and one end of the resistor 17 are connected to the positive terminal of a battery 27. The collector of the transistor 6 is connected to the collector of the transistor 9 and one terminal of a motor 18 which is operatively connected to the door 2 so as to actuate the door 2. A resistor 19 is connected between the base and the emitter of the transistor 13 whose emitter is connected to the positive terminal of the battery 27 and whose collector is connected to the collector of the transistor 16 and the other terminal of the motor 18. The base of the transistor 9 is grounded through a resistor 20 and the base of the transistor 16 is grounded through a resistor 21. The emitters of the transistors 9 and 16 are directly grounded.

The operation of the circuit shown in FIG. 1 will now be described. When $V_{IN}$ is greater than $V_H$ the output level of the voltage comparator 4 is "H" and the output level of the voltage comparator 10 is "L". Consequently, the transistors 9 and 13 are ON so that the current flows in the direction shown by the arrow A through the transistor 13, the motor 18 and the transistor 9 from the battery to the ground to render the motor 18 operative.

When $V_{IN}$ becomes greater then $V_L$ but less than $V_H$, the output levels of the voltage comparators 4 and 10 both become "L" so that the transistors 9 and 16 are turned OFF to stop the current from flowing through the motor 18. In this case, since the transistors 6 and 13 are turned ON at the same time, the current due to the counter electromotive force produced in the motor 18 flows through the transistor 6 and a diode 22 or through the transistor 13 and a diode 23, depending upon the direction of the current that flowed through the motor 18. Therefore, a damping force due to the current acts on to the motor 18 so that the motor 18 stops rapidly.

When $V_{IN}$ is less than $V_L$, since the output levels of the voltage comparators 4 and 10 are "L" and "H", respectively, the transistors 6 and 16 are ON and the transistors 9 and 13 are OFF. Therefore, the current flows through the motor 18 in the direction opposite to the arrow A, so that the motor 18 drives the door 2 in the reverse direction. As a result, the motor 18 is controlled in such a way that the level of the position voltage signal $V_{IN}$ is always between the levels of the reference voltages $V_H$ and $V_L$.

In the above-described conventional circuit, as shown in FIG. 2, when the output level of the voltage comparator 4 is "H", the transistor 9 and the transistor 13 are ON at the same time, so that the current flows through the motor 18 in the direction shown by the arrow A.

On the other hand, when the output level of the voltage comparator 4 changes to "L", the transistor 9 is turned OFF while the transistor 6 is turned ON approximately in synchronization with the change in state of the transistor 9. That is, the transistor 6 is turned ON when the transistor 9 is turned OFF. However, due to the response characteristics of the voltage comparator 4 and the transistors 6 and 9, both transistors 6 and 9 are ON at the same time in the period S shown in FIG. 2 so that a short circuit condition occurs through the transistors 6 and 9 in this circuit. Furthermore, if chattering occurs at the time the output level of the voltage comparator 4 is changed, the apparent response speed of the transistors to the change in the output level is decreased, so that the short circuit condition described above is liable to be even more pronounced. This results in a large flow of current through the transistors 6 and 9 and shortens the service lives of these transistors. This problem also occurs in the case of the transistors 13 and 16.

To eliminate the above mentioned drawbacks, there has been proposed a circuit arrangement in which a resistor 24 is connected between the emitter circuits of the transistors 9 and 16 as shown by a broken line in FIG. 1 to prevent a large current from flowing. However, with this arrangement, due to the voltage drop developed across the resistor 24, the effective voltage value applied to the motor 18 becomes low, so that the motor speed is reduced and the response speed of the motor 18 becomes lower. Moreover, in the conventional circuit described above, if a battery damping surge appears when the transistors 6 and 16 are OFF and the transistors 9 and 13 are ON, since the voltage applied to the voltage comparator 4 is suppressed by means of a resistor 25 and a capacitor 26, the magnitude of the output level of the voltage comparator 4 at "H" condition becomes considerably lower than the voltage level of the battery. As a result, the transistor 6 turns ON and a short current flows from the transistor 6 to the transistor 9 to burn these transistors.

It is, therefore, an object of the present invention to provide an improved control circuit for electromagnetic devices.

It is another object of the present invention to provide a control circuit for electromagnetic devices, in which the current flowing through an electromagnetic device can be controlled without the occurrence of a short current in the control circuit.

It is a further object of the present invention to provide a control circuit for electromagnetic devices, which is able to operate an electromagnetic device, such as an electric motor, a solenoid actuator or the like, at high response speed without the occurrence of a short current in the control circuit.

In a control circuit for an electromagnetic device comprising a first switching transistor connected between one input terminal of the electromagnetic device and the positive terminal of a d.c. power source, a second switching transistor connected between the one input terminal and the negative terminal of the d.c. power source, a third switching transistor connected between the other input terminal of the d.c. power source and the positive terminal of the d.c. power source, and fourth switching transistor connected between the other input terminal and the negative terminal of the d.c. power source, the control circuit of the present invention comprises means responsive to an input signal for generating a first and a second control signal, a first driving circuit responsive to the first control signal for controlling the conducting state of the first switching transistor so as to be in the opposite conducting state to that of the second switching transistor in such a way that one of the first and the second switching transistors is turned ON after the other one is substantially turned OFF, and a second driving circuit responsive to the second control signal for controlling the conducting state of the third switching transistor so as to be in the opposite conducting state to that of the fourth switching transistor in such a way that one of the third and the fourth switching transistors is turned ON after the other one is substantially turned OFF.

The first driving circuit may include a first circuit for substantially turning OFF the first switching transistor within the level region where the level of the first control signal is less than a predetermined first level and a second circuit for substantially turning OFF the second switching transistor within the level region where the level of the first control signal is greater than a predetermined second level which is less than the first level.

In similar way, the second driving circuit may be arranged so as to be composed of a third circuit for substantially turning OFF the third switching transistor within the level region where the level of the second control signal is less than a predetermined third level and a fourth circuit for substantially turning OFF the fourth switching transistor within the level region where the level of the second control signal is greater than a predetermined fourth level which is less than the third level.

According to the above-mentioned circuit arrangement of the present invention, since the first and second switching transistors are never ON at the same time and the third and fourth switching transistors are never ON at the same time either, during the current controlling operation by these switching transistors, the flow of short current through the switching transistors in reliably prevented without need for a current limiting resistor. As a result, power waste is prevented and the effective voltage applied to the electromagnetic device will be increased so that the response speed of the electromagnetic device, such as a motor or solenoid actuator, can be improved.

Further objects and advantages of the present invention will be apparent from the following detailed description.

In the drawing:

FIGS. 2A to 2C are timing charts illustrating the ON/OFF state of the transistors responsive to the output level of the comparator in the circuit of FIG. 1;

Figure 1:
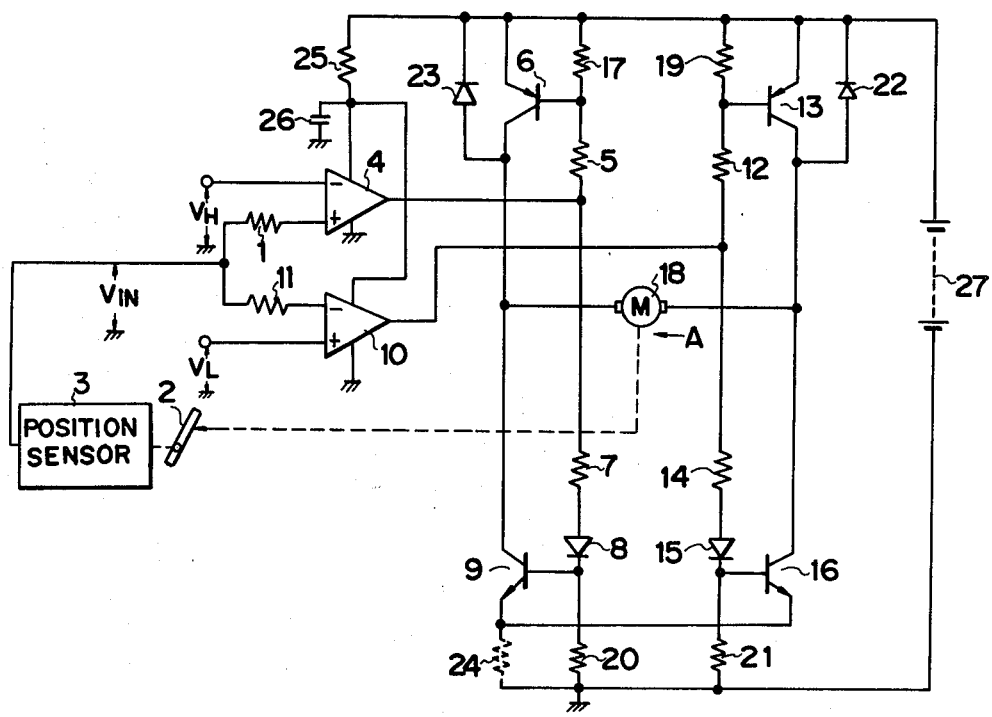
FIG. 1 is a circuit diagram of an example of a conventional control circuit for controlling the current flowing through an electric motor.
Figure 3:
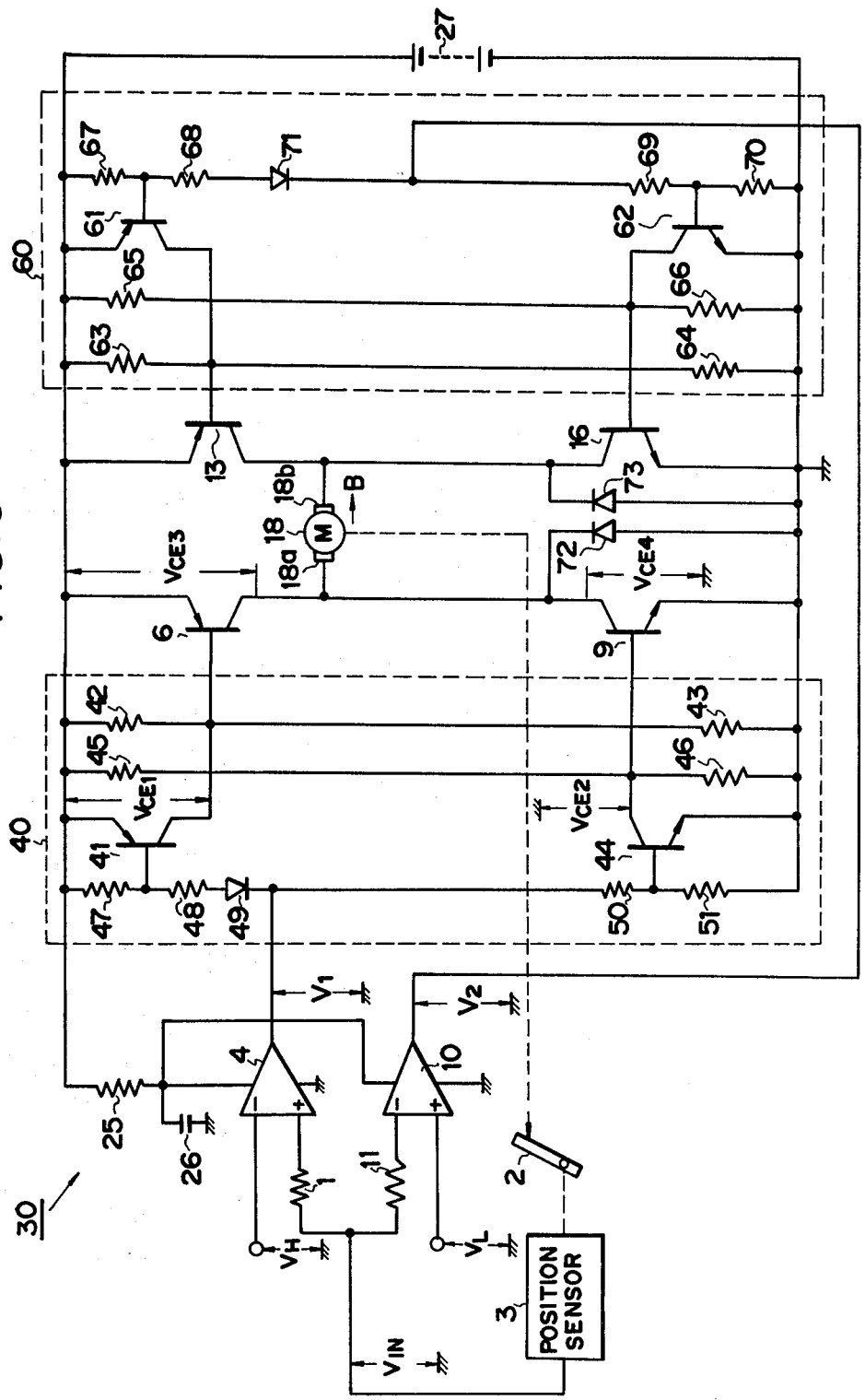
FIG. 3 is a circuit diagram of one embodiment of a control circuit for electromagnetic devices according to the present invention.

Referring to FIG. 3, there is shown an embodiment of a control circuit 30 of the present invention, which serves to control an electric motor 18 for actuating a door 2 of a vehicle air-conditioner. In FIG. 3, components corresponding to those in FIG. 1 are designated by like reference numbers. The control circuit 30, like the control circuit shown in FIG. 1, has switching transistors 6, 9, 13 and 16 which serve to control the current flowing through the motor 18. The transistor 6 is connected between the positive terminal of a battery 27 and one terminal 18a of the motor 18, the transistor 9 between the terminal 18a and ground, the transistor 13 between the other terminal 18b of the motor 18 and the positive terminal of the battery 27, and the transistor 16 between the terminal 18b and ground.

In order that the switching states or conducting state of the transistor 6 and 9 can be changed so as to be opposite to each other in response to the change in the output voltage $V_1$ of a voltage comparator 4 and so as not to turn ON the transistors 6 and 9 at the same time, a first driving circuit 40 is provided between the voltage comparator 4 and the transistors 6 and 9. The collector of a transistor 41 whose emitter is connected to the positive terminal of the battery 27 is connected to the base of the transistor 6 and a voltage produced between resistors 42 and 43 is applied as a bias voltage to the base of the transistor 6, so that the transistor 6 will be maintained ON by the application of this bias voltage when the transistor 41 is OFF. On the other hand, the collector of a transistor 44 whose emitter is grounded is connected to the base of the transistor 9 and a voltage appearing at the connecting point of resistors 45 and 46 is applied to the base of the transistor 9 as a bias voltage. As a result, when the transistor 44 is OFF, the transistor 9 will be maintained ON due to this bias voltage. The base of the transistor 41 is connected through a resistor 47 to the positive terminal of the battery 27 and is connected through a resistor 48 and a diode 49 to the output terminal of the voltage comparator 4. The output terminal of the voltage comparator 4 is also grounded through resistors 50 and 51 and the voltage appearing at the connecting point of the resistors 50 and 51 is applied to the base of the transistor 44.

In order that the switching or conducting states of the transistors 13 and 16 can be changed so as to be opposite to each other and so as not to turn ON the transistors 13 and 16 at the same time in response to the level change of the output voltage $V_2$ of the voltage comparator 10, a second driving circuit 60 is provided between the voltage comparator 10 and the transistors 13 and 16. The collector of a transistor 61 whose emitter is connected to the positive terminal of the battery 27 is connected to the base of the transistor 13 and a voltage produced at the connecting point of resistors 63 and 64 is applied as a bias voltage to the base of the transistor 13, so that the transistor 13 will be maintained ON by the application of this bias voltage when the transistor 61 is OFF. On the other hand, the collector of a transistor 62 whose emitter is grounded is connected to the base of the transistor 16 and a voltage produced appearing at the connecting point of resistors 65 and 66 is applied to the base of the transistor 16 as a bias voltage. As a result, when the transistor 62 is OFF, the transistor 16 will be maintained ON due to this bias voltage. The base of the transistor 61 is connected through a resistor 67 to the positive terminal of the battery 27 and is connected through a resistor 68 and a diode 71 to the output terminal of the voltage comparator 10. The output terminal of the voltage comparator 10 is also grounded through resistors 69 and 70 and the voltage appearing at the connecting point of the resistors 69 and 70 is applied to the base of the transistor 62.

The operation of the control circuit 30 will now be described.

When the level of $V_{IN}$ is more than $V_H$, the level of the output voltage $V_1$ of the voltage comparator 4 is "H" and the level of the output voltage $V_2$ of the voltage comparator 10 is "L". Therefore, the transistors 41 and 62 are OFF and the transistors 44 and 61 are ON, so that only transistors 6 and 16 of the four switching transistors are ON. As a result, a current flows through the motor 18 in the direction shown by the arrow B, and the door 2 is driven to reduce the level of $V_{IN}$.

When the level of $V_{IN}$ is greater than the level of $V_L$ but less than the level of $V_H$, since the levels of the output voltages $V_1$ and $V_2$ are "L", the transistors 9 and 16 are ON and the transistors 6 and 13 are OFF. Consequently, in this case, the current does not flow through the motor 18 and the driving operation of the door 2 is stopped.

When the level of $V_{IN}$ is less than that of $V_L$, since the level of the output voltage $V_1$ is "L" and the level of the output voltage $V_2$ is "H", the transistors 6 and 16 are OFF and the transistors 9 and 13 are ON. Consequently, the motor driving current flows through the motor 18 in the direction opposite to the direction shown by the arrow B, and the door 2 is driven in the direction that causes the level of $V_{IN}$ to increase. When the level of $V_{IN}$ becomes greater than the level of $V_L$ but less than the level of $V_H$ because of the rotation of the door 2, the output level of the voltage comparator 4 becomes "L" to turn OFF the transistors 6 and 13. Therefore, the current does not flow through the motor 18. At the same time, since the transistors 9 and 16 are turned ON, depending upon the direction of the current flowing through the motor 18 just before the switching operation, the current due to the counter electromotive force produced in the motor 18 flows through the transistor 9 and a diode 73 or through the transistor 16 and a diode 72. As a result, a damping force due to the current is applied to the motor 18 so that the motor 18 stops rapidly.

The operations of the first driving circuit 40 and the driving transistors 6 and 9 during the transient period in which the level of the output voltage $V_1$ of the voltage comparator 4 is between the "H" level and "L" levels, will now be described in conjunction with FIGS. 4A to 4E.

Figure 4A:
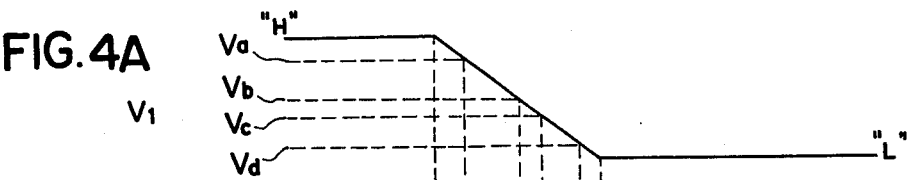
FIGS. 4A to 4E are timing charts illustrating the ON/OFF states of the switching transistors during the transient period in the circuit of FIG. 3.
Figure 4B:

As shown is FIG. 4A, the level of the output voltage $V_1$ is "H" until the time $t$ reaches $t_1$, the level of the output voltage $V_1$ gradually decreases after the time $t_1$, and the level of $V_1$ becomes "L" at the time $t_2$. Following time $t_1$, when the level of the output voltage $V_1$ is $V_a$ at the time $t_3$, the bias voltage applied between the base and the emitter of the transistor 41 by the resistors 47 and 48 becomes greater than the base-emitter diffusion voltage, so that the base current thereof starts to flow. The base current increases with the decrease in the level of the output voltage $V_1$, so that the base voltage of the transistor 6 gradually approaches the positive terminal voltage of the battery 27. The value of the time $t_3$ when the base current of the transistor 41 starts to flow and the rate at which the base voltage of the transistor 6 decreased with the increase in the base current of the transistor 40 depend upon the value of the resistors 47 and 48. The transistor 41 is substantially turned ON when the level of the output voltage $V_1$ is $V_b$ at the time $t_4$. The operation described above is shown in FIG. 4B as the change in the collector-emitter voltage $V_{CE1}$ of the transistor 41. As will be seen from FIGS. 4B and 4E, the degree of conductivity of the transistor 6 changes in accordance with the voltage $V_{CE1}$, the collector-emitter voltage $V_{CE3}$ of the transistor 6 begins to increase after the time $t_3$ and the transistor 6 is substantially turned ON at the time $t_4$. In this case, the length of the time $(t_4-t_3)$ depends upon the current transfer ratio of the transistor 41 and the like.

Figure 4C:
Figure 4D:
Figure 4E:
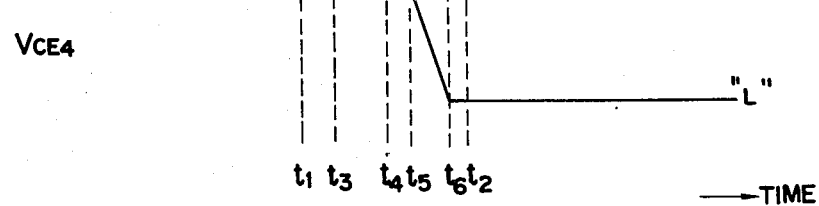

On the other hand, the output voltage $V_1$ is divided by resistors 50 and 51 and the resulting divided voltage is applied to the base of the transistor 44. The resistance values of the resistors 50 and 51 are determined in such a way that the collector-emitter voltage $V_{CE2}$ changes in accordance with the change in the output voltage $V_1$ when the level of the output voltage $V_1$ is less than $V_c (< V_b)$ (FIG. 4C). When the level of the output voltage $V_1$ is decreases to $V_d$ at the time $t_6$, the transister 44 is substantially turned OFF. Therefore, the decrease in the collector-emitter voltage $V_{CE4}$ of the transistor 9 starts at the time $t_5$ and the transistor 9 is substantially turned ON at the time $t_6$ as shown in FIG. 4E. In this case, the length of the time $(t_6-t_5)$ depends upon the current transfer ratio of the transistor 44 and the like.

As will be seen from the foregoing description, the bias circuits of the transistors 41 and 44 are in such a way that one transistor is turned ON or OFF after the other transistor is substantially or completely turned OFF or ON in response to the level change of the output voltage $V_1$, so that it never occurs that these two transistors 41 and 44 are OFF at the same time. Consequently, the transistors 6 and 9 can be prevented from being turned ON at the same time, so that short current never flows through the transistors 6 and 9 at the same time.

Although the foregoing description relates to the case where the output voltage $V_1$ changes in level from "H" to "L", the same reasoning applies to the case, where the output voltage $V_1$ changes in level from "L" to "H" so that the transistors 9 and 6 are never ON at the same time in this case either.

The second driving circuit 60 and the switching transistors 13 and 16 are also operated in response to the level change of the output voltage $V_2$ in a similar way to that of the first driving circuit and the switching transistors 6 and 9, so that the transistors 13 and 16 can also be prevented from being ON at the same time.

Consequently, during the current controlling operation, the flow of a large short current through the switching transistors from the battery can be prevented without need for any current limiting resistors. As a result, wasting of battery power is prevented, and the effective voltage applied to the motor 18 will be increased so that the response speed of the motor 18 can be improved.

The embodiment shown in FIG. 3 is arranged as a circuit for controlling an electric motor employed in a vehicle air-conditioner. However, this is not intended to limit the present invention to a control circuit for controlling a motor, and the present invention is applicable to a circuit for controlling the driving current of any other electromagnetic device, such as a solenoid actuator or the like.

We claim:

1. A control circuit for an electromagnetic device, which controls the current supplied from a d.c. power source to the electromagnetic device in response to an input signal, comprising:
    a first switching transistor provided between one power input terminal of said electromagnetic device and the positive terminal of said d.c. power source;
    a second switching transistor provided between said one power input terminal and the negative terminal of said d.c. power source;
    a third switching transistor provided between the other power input terminal of said electromagnetic device and said positive terminal;
    a fourth switching transistor provide between said other power input terminal and said negative terminal;
    means responsive to said input signal for generating a first and second control signals;
    means including a first driving circuit responsive to said first control signal for controlling the conducting states of said first and said second switching transistors so as to cause said conducting states to be opposite to one another in such a way that one of said first and said second switching transistors is turned ON after the other is substantially turned OFF; wherein said first driving circuit has means including a first circuit substantially turning OFF said first switching transistor within the region where the level of said first control signal is less than a predetermined first level and a means including a second circuit for substantially turning OFF said second switching transistor within the region where the level of said first control signal is more than a predetermined second level which is less than said first level; and
    means including a second driving circuit responsive to said second control signal for controlling the conducting states of said third and said fourth switching transistors so as to cause said conducting states to be opposite to one another in such a way that one of said third and said fourth switching transistors is turned ON after the other is substantially turned OFF; wherein said second driving circuit has means including a third circuit for substantially turning OFF said third switching transistor within the region where the level of said second control signal is less than a predetermined third level and means including a fourth circuit for substantially turning OFF said forth switching transistor within the region where the level of said second control signal is more than a predetermined fourth level which is less than said third level.

2. A control circuit for an electromagnetic device as claimed in claim 1 wherein said first circuit has a first bias circuit for applying to the base of said first switching transistor a first bias voltage which serves to turn ON said first switching transistor, a first driving transistor connected between the base and the emitter of said first switching transistor and a bias circuit for substantially turning ON said first driving transistor in response to the fact that the level of said first control signal is less than said first level, and said second circuit has a second bias circuit for applying to the base of said second switching transistor a second bias voltage which serves to turn ON said second switching transistor, a second driving transistor connected between the base and the emitter of said second switching transistor and a bias circuit for substantially turning ON said second driving transistor in response to the fact that the level of said first control signal is more than said second level.

3. A control circuit for an electromagnetic device as claimed in claim 1 wherein said third circuit has a third bias circuit for applying to the base of said third switching transistor a third bias voltage which serves to turn ON said third switching transistor, a third driving transistor connected between the base and the emitter of said third switching transistor and a bias circuit for substantially turning ON said third driving transistor in response to the fact that the level of said second control signal is less than said third level, and said fourth circuit has a fourth bias circuit for applying to the base of said fourth switching transistor a second bias voltage which serves to turn ON said fourth switching transistor, a fourth driving transistor connected between the base and the emitter of said fourth switching transistor and a bias circuit for substantially turning ON said fourth driving transistor in response to the fact that the level of said second control signal is more than said fourth level.

4. A control circuit for an electromagnetic device as claimed in claim 1 wherein said means for generating a first and a second control signals has a first voltage comparator for comparing the level of said input signal with a first reference level and a second voltage comparator for comparing the level of said input signal with a second reference level which is less than said first reference level and the output signals of said first and said second voltage comparators are said first and said second control signals, respectively.

5. A control circuit for an electromagnetic device, which controls the current supplied from a d.c. power source to an electric motor for driving a door of a vehicle air-conditioner in response to an input signal indicative of the position of said door, comprising:
    a first switching transistor provided between one power input terminal of said motor and the positive terminal of said d.c. power source;
    a second switching transistor provided between said one power input terminal and the negative terminal of said d.c. power source;
    a third switching transistor provided between the other power input terminal of said motor and said positive terminal;
    a fourth switching transistor provided between said other power input terminal and said negative terminal;

a first voltage comparator for comparing the level of said input signal with a first reference level;

a second voltage comparator for comparing the level of said input signal with a second reference level which is less than said first reference level;

means including a first driving circuit responsive to a first control signal for controlling the conducting states of said first and said second switching transistors so as to cause said conducting states to be opposite to one another in such a way that one of said first and said second switching transistors is turned ON after the other is substantially turned OFF, said first control signal being indicative of the result of comparison in said first voltage comparator; and means including a second driving circuit responsive to a second control signal for controlling the conducting states of said third and said fourth switching transistors so as to cause said conducting states to be opposite to one another in such a way that one of said third and said fourth switching transistors is turned ON after the other is substantially turned OFF, said second control signal being indicative of the result of comparison in said second voltage comparator.

* * * * *